（12）United States Patent
Xun et al.

(10) Patent No.: US 8,484,417 B2
(45) Date of Patent: Jul. 9, 2013

(54) LOCATION UPDATES FOR A DISTRIBUTED DATA STORE

(75) Inventors: Lu Xun, Kirkland, WA (US); Hua-Jun Zeng, Redmond, WA (US); Muralidhar Krishnaprasad, Redmond, WA (US); Radhakrishnan Srikanth, Sammamish, WA (US); Ankur Agrawal, Hyderabad (IN); Balachandar Pavadaisamy, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 10 days.

(21) Appl. No.: 13/337,093

(22) Filed: Dec. 24, 2011

(65) Prior Publication Data

US 2012/0096103 A1 Apr. 19, 2012

Related U.S. Application Data

(62) Division of application No. 12/466,390, filed on May 15, 2009, now Pat. No. 8,108,612.

(51) Int. Cl.
 *G06F 13/00* (2006.01)
 *G06F 13/28* (2006.01)

(52) U.S. Cl.
 USPC ............... 711/129; 711/173; 711/E12.001; 711/E12.038

(58) Field of Classification Search
 USPC ............... 711/129, 173, E12.001, E12.038
 See application file for complete search history.

(56) References Cited

U.S. PATENT DOCUMENTS

| 7,343,432 | B1 * | 3/2008 | Niver et al. ................ 710/36 |
| 7,483,318 | B2 * | 1/2009 | Ogihara et al. ............. 365/200 |
| 2010/0049921 | A1 * | 2/2010 | Aronovich et al. ........... 711/130 |
| 2010/0049922 | A1 * | 2/2010 | Aronovich et al. ........... 711/147 |

\* cited by examiner

*Primary Examiner* — Ly D Pham
(74) *Attorney, Agent, or Firm* — Jared S. Goff

(57) ABSTRACT

Version indicators within an existing range can be associated with a data partition in a distributed data store. A partition reconfiguration can be associated with one of multiple partitions in the data store, and a new version indicator that is outside the existing range can be assigned to the reconfigured partition. Additionally, a broadcast message can be sent to multiple nodes, which can include storage nodes and/or client nodes that are configured to communicate with storage nodes to access data in a distributed data store. The broadcast message can include updated location information for data in the data store. In addition, a response message can be sent to a requesting node of the multiple nodes in response to receiving from that node a message that requests updated location information for the data. The response message can include the requested updated location information.

15 Claims, 14 Drawing Sheets

LOCATION UPDATES FOR A DISTRIBUTED DATA STORE

RELATED APPLICATIONS

This application claims priority as a divisional application of U.S. patent application Ser. No. 12/466,390, filed May 15, 2009, which is incorporated herein by reference.

BACKGROUND

A continuing problem in computer systems remains handling the growing amount of available information or data. The sheer amount of information being stored on disks or other storage media for databases in some form has been increasing dramatically. While files and disks were measured in thousands of bytes a few decades ago—at that time being millions of bytes (megabytes), followed by billions of bytes (gigabytes)—now databases of a million megabytes (terabytes) and even billions of megabytes are being created and employed in day-to-day activities.

With the costs of memory going down, considerably large caches can be configured on the desktop and server machines. In addition, in a world where hundreds of gigabytes of storage is the norm, the ability to work with most data in large caches can increase productivity and efficiency because the caches can be configured to retrieve data more quickly than the same data can be retrieved from many mass data stores. A cache is a collection of data that duplicates original value(s) stored elsewhere or computed earlier, where the cached data can be read from the cache in lieu of reading the original value(s). A cache is typically implemented where it is more efficient to read the cached data than to read the original value(s) so that use of the cache can increase the overall efficiency of computing systems.

In an effort to scale the size of caches and other data stores in an organized manner, some data stores are configured as distributed partitioned data stores. A distributed data store is a data store that is distributed across one or more data store nodes. Typically, a distributed data store is distributed across one or more physical or virtual computing machines. A distributed partitioned data store is a data store that is partitioned across multiple data store nodes, where a primary location for each partition is on a single node. As used herein, a node refers to a storage process in a data store system. A node may be on a single machine or spread across multiple physical machines, and a single physical machine may include multiple storage nodes, such as where a single physical machine hosts multiple virtual machine processes. Thus, the distributed partitioned data store is spread over multiple storage processes, so that the entire set of primary data to be read from the data store is not stored on a single process, and typically is not stored on a single machine. A partition is a logical grouping of data, which may be implemented by associating a partition with a set of one or more keys, where the keys are in turn associated with data stored on a node. In a data store, a partition can be stored as a primary partition, which includes primary partition data in the data store, and one or more secondary partitions, which each include secondary partition data in the data store. As used herein, the term "primary" data indicates the data that is currently set up to be accessed in the data store, such as to be read from the data store, as opposed to secondary or replicated data that is currently being stored as a backup. The primary data may also be replicated from other data outside the data store. For example, in a distributed cache the primary data may be replicated from more authoritative data that is stored in long-term mass storage. The term "primary" is similarly used to refer to a primary region or partition, which is a region or partition currently set up to be accessed, as opposed to a replica of the primary region or partition. The term "primary" can also be used to refer to a primary node, which is a node that stores the primary data, such as a primary region. Note, however, that a cache node can be a primary node for one set of cache data and a secondary node for another set of cache data. A distributed partitioned data store system is a system that is configured to implement such distributed partitioned data stores. In such a system, messages passing between nodes may not be reliable. For example, messages may be delayed, re-ordered, or lost.

SUMMARY

Whatever the advantages of previous data store tools and techniques, they have neither recognized the distributed data store location update tools and techniques described and claimed herein, nor the advantages produced by such tools and techniques, which may include improved reliability and/or efficiency.

In one embodiment of the tools and techniques, version indicators within an existing range can be maintained. Each version indicator can be associated with one of multiple data partitions in a distributed data store. A partition reconfiguration in the data store can be associated with a reconfigured partition. A new version indicator that is outside the existing range can be assigned to the reconfigured partition, producing in a new range of version indicators that includes the new version indicator.

In another embodiment of the tools and techniques, a broadcast message can be sent to multiple nodes, which can include storage nodes and/or client nodes that can communicate with storage nodes to access data in a distributed data store. The broadcast message can include updated location information for data in the distributed data store. In addition, a response message can be sent to a requesting node of the multiple nodes in response to receiving from that node a message that requests updated location information for the data in the data store. The response message can include the requested updated location information.

In yet another embodiment of the tools and techniques, a message requesting access to data in a distributed data store can be sent to a node in the data store, and a failure notification can be received from the node. Upon receiving the failure notification, a message requesting updated location information for the data can be sent, and the updated location information can be received.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
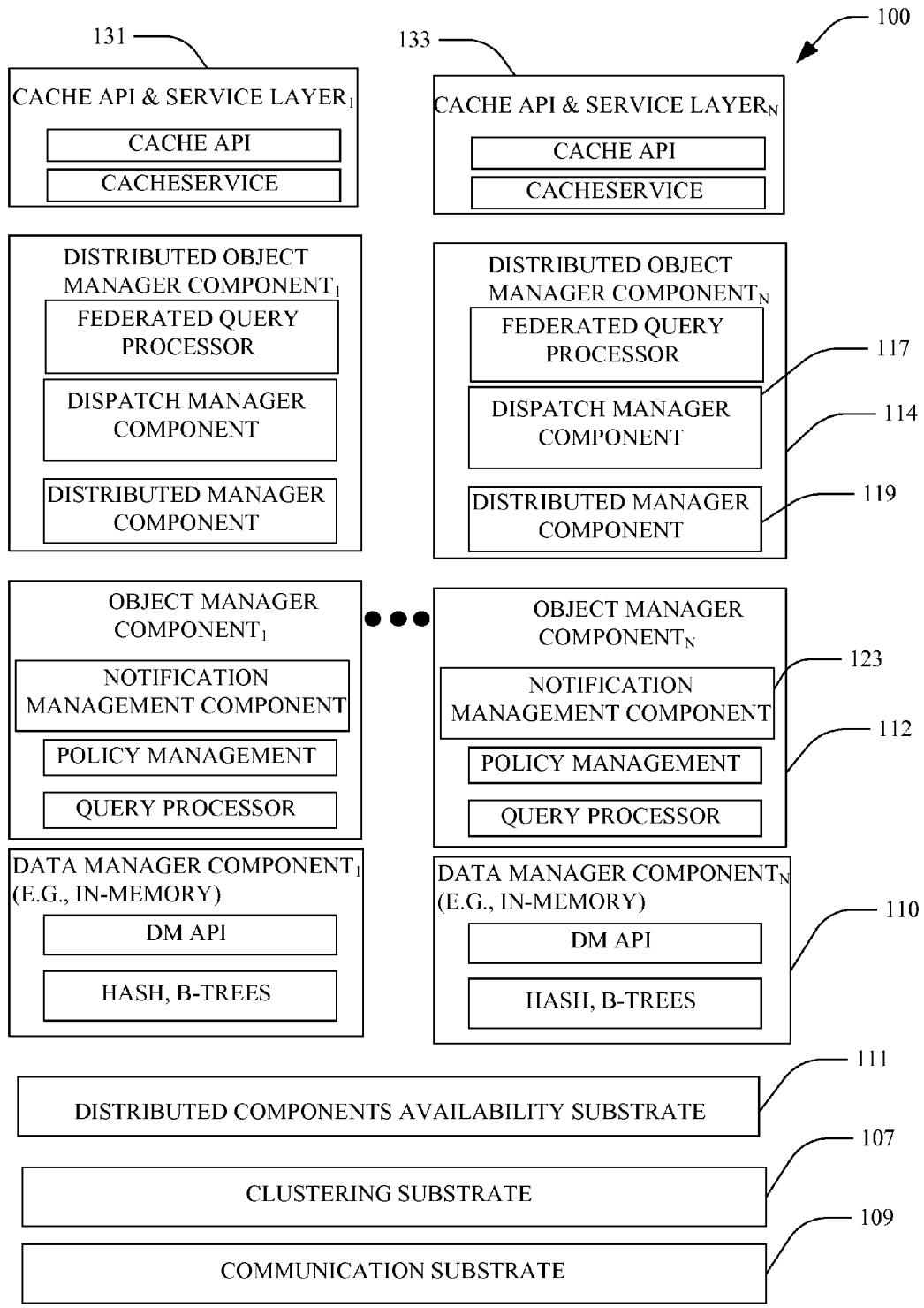
FIG. 1 illustrates an exemplary layering arrangement.

Described embodiments are directed to techniques and tools for improved location updates for a data store. Such improvements may result from the use of various techniques and tools separately or in combination.

Such techniques and tools may include maintaining version indicators in a version data structure. The version indicators can be within an existing range, which may be a numeric range, an alphabetical range, an alphanumeric range, etc. Also, the range may include gaps between adjacent version indicator values, which may be numeric values, alphabetical values, alphanumeric values, etc. Each version indicator can be associated with a data partition in a distributed data store. When a partition in the data store is reconfigured, a new version indicator, which is outside the existing range, can be assigned to the reconfigured partition. Thus, a new range of version indicators can include the new version indicator at the end (e.g., high end or low end) of the new range.

The version indicators can be used to determine whether corresponding partitions have been reconfigured, making existing location information for the corresponding partitions out of date. For example, if a client node (i.e., a node that is configured to receive data from the data store) has location information versions corresponding to version indicators in a range of 85 to 125, but an authoritative version data structure (such as a general partition map for the data store) has location information versions corresponding to version indicators in the range of 85 to 150, then it can be determined that the client node's location information is out of date. Accordingly, the location information corresponding to version indicators 126 to 150 in the authoritative data structure can be sent to the client node so that the client node's location information will be up to date.

As used herein, reconfiguration of one or more partitions can be any change that would result in location information associated with the partition being changed, such as moving a partition from one node to another, adding a new partition, or even reconfiguring a primary node that hosts the partition so that existing location information is no longer accurate. Partition location information is information that facilitates accessing the corresponding partition, such as an identification of a primary storage node for the partition and possibly additional information to access the primary storage node or to access the partition within the primary node. For example, location information can include IP addresses, URL's, storage drive and path identifiers, ports in storage nodes, etc.

Location information can be sent in a broadcast message to nodes, such as client and/or storage nodes. A broadcast message is a message that is sent to multiple nodes. Broadcast messages may be sent periodically according to a set schedule or when a certain number of reconfigurations have occurred since a previous broadcast message, or according to some other scheme. Accordingly, client and/or storage nodes that have received the broadcast messages can use the location information in the broadcast messages to request access to the data in the data store.

In addition to these broadcast messages, a client node can request updated location information if the client node finds that its location information is out of date (such as where it receives a failure message in response to a request to access data in the data store). The client can receive a response with the requested updated location information, and can use that updated information to again request access to the data in the data store. Version indicators can be used in these messages. For example, a client node can indicate in a location information request message what version indicators correspond to versions of location information the client has already received, and the response to the request can include all updated location information versions (as indicated by corresponding version indicators) that the client has not yet received. Version indicators can also be used to send appropriate updates in broadcast messages.

Accordingly, one or more substantial benefits can be realized from the data store location update tools and techniques described herein. However, the subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. Moreover, for the sake of simplicity, flowcharts may not show the various ways in which particular techniques can be used in conjunction with other techniques.

I. General Cache Layering Arrangement

The memory capacity of multiple computers or processes can be aggregated into a single unified cache, which can be scalable (e.g., a dynamic scaling) to a plurality of machines via a layering arrangement. Such layering arrangement can cache serializable Common Language Runtime (CLR) objects and provide access through a simple cache application programming interface (API). The layering arrangement can include a data manager component, an object manager component and a distributed object manager component, which can be implemented in a modular fashion. In one aspect, the data manager component supplies basic data functions (e.g., hash functions), and the object manager component implements object facade thereon including cache objects—while the distributed object manager provides distribution of the data in the distributed cache.

As such, the object manager component can map regions to containers and manage data eviction thresholds and supply policy management for cached data. Such regions can represent cache containers that typically guarantee co-locations of the object placed/inserted in the container (e.g., co-locations of objects in same node). Additionally, the object manager component can raise notifications (e.g., due to changes made to cached data) for various regions or objects of the distributed cache. Likewise, the distributed object manager component can dispatch requests to various nodes associated with different regions of the distributed cache.

Moreover, the distributed object manager can interface with partition maps, or routing tables, of the distributed cache for a given request, and can facilitate abstraction of the aggregated cache in the distributed environment, to a single unified cache. In one aspect, the distributed object manager component is positioned on top of the object manager component, which itself is placed on top of the data manager component. Moreover, tight integration can be provided with ASP.NET to enable cache ASP.NET session data in the cache without having to write it to source databases, for example.

These components can provide pluggable features that can readily adapt to a user's preferences (e.g., replacing a data manger component with another type thereof, based on user preferences). Likewise, the object manager component can be replaced with another object manager component, wherein plugging different models in the layering arrangement is enabled by enabling a call back mechanism with holding locks during call back throughout the stack.

In a related aspect, the layering arrangement can provide for a modular arrangement that facilitates operation on different levels and communication substrates (e.g., TCP/IP), and which can be implemented in two topology models, namely as an independent separate tier model or an embedded application model. In the independent and separate tier model, the caching layer can function as an independent separate tier by itself (which can be positioned between application servers and data servers). For example, in such a configuration the distributed cache can run as a service hosted either by Windows Activation Services (WAS) or windows service, and can run separate from the application. The applications can either employ the client stubs provided by the distributed cache to talk thereto, or can communicate through a representational state transfer (REST) API directly into the service.

Alternatively, in the embedded application model the cache can be embedded within the application itself (e.g., connecting the applications together to form a cluster—such as embedding caches in ASP.net instances to form a cluster of ASP.net machines, wherein upon storing an item in a local cache it can be viewed from other machines.) This embedding can further enable tagging and Language Integrated Query (LINQ) queries on the objects from a functionality perspective. LINQ queries can then be run natively on stored objects, and can be embedded in .Net applications.

The various aspects of the described tools and techniques will now be described with reference to the annexed drawings, wherein like numerals refer to like or corresponding elements throughout. However, the drawings and detailed description relating thereto are not intended to limit the claimed subject matter to the particular form disclosed. Rather, the intention is to cover all modifications, equivalents and alternatives falling within the spirit and scope of the claimed subject matter. For example, data store updating may be implemented in an arrangement other than the disclosed cache layering arrangement.

II. Cache System & Tools

A. Cache Layering

FIG. 1 illustrates an exemplary layering arrangement that can enable aggregating memory capacity of multiple computers into a single unified cache. Such layering arrangement (100) can provide for a scalable system that can be tailored to different types of communication layers such as TCP/IP, and pluggable features can be further enabled for readily adapting to a user's preferences. The distributed cache system implementing the layering arrangement (100) can dynamically scale itself with growth of applications associated therewith, by addition of additional computers or storage processes as nodes to a cluster of machines and/or storage processes. As illustrated in FIG. 1, each of the cache nodes (131, 133) (1 to n, n being an integer) of the layering arrangement (100) can include a data manager component (110), an object manager component (112) and a distributed object manager component (114), the set up of which can be implemented in a modular fashion. The distributed object manager component (114) can be positioned on top of the object manager component (112), which can be placed on top of the data manager component (110). The data manager component (110) can supply basic data functions (e.g., hash functions), and the object manager component (112) can implement object facade thereon including cache objects, with the distributed object manager component (114) providing the distribution. As such, the object manager component (112) and data manager component (110) can act as local entities, wherein the distributed object manager component (114) can perform distributions.

Moreover, a clustering substrate (107) can establish clustering protocols among a plurality of nodes that form a single unified cache. For example, when a node is to join or leave the cluster, requisite operations for adding or leaving the cluster can be managed, wherein a distributed components availability substrate (111) can employ such information to manage operations (e.g., monitoring health of nodes, managing life cycles of nodes, creating a primary node on another machine). In addition, for each node, each of the components forming the layering arrangement can be pluggable based on user preferences, system features, and the like.

As explained earlier, the data manager component (110) (e.g., in memory) can provide primitive high performance data structures such as hash tables, Btrees, and the like. Since the data manager component (110) can be memory bound and all operations of the distributed cache can be atomic, the data manager component (110) can typically implement highly concurrent hash tables. The data manager component (110) and the hash table structures can further facilitate creating the infrastructure for supplying containers and indexes on containers. In addition, the data manager component (110) can provide simple eviction and expiration on these hash structures. Due to pluggable features supplied by the layering arrangement (100), users can plug in different types of data managers tailored to users' preferences, such as a transaction data manager or a disk paged data manager, or the like. Likewise, the object manager component (112) can provide object abstraction and can implement the concept of named caches and regions by employing data structures provided by the data manager component (110).

Similarly, the distributed object manager component (114) can employ the local object manager component (112) and integrate with the distributed components availability substrate (111) to provide the abstraction of the distributed cache. The distributed components availability substrate (111) can provide the transport and data consistency operations to make the system scalable and available. The distributed object manager component (114) can optionally be implemented as part of a client tier to facilitate dispatching requests (e.g., directly) to the nodes associated with the single unified cache.

In one particular aspect, the distributed object manager component (114) can further include a dispatch manager component (117) and a distributed manager component (119). The dispatch manager component (117) can further look up the routing table to dispatch the requests to a primary node (e.g., where a primary region is located) as part of a dynamically scalable distributed cache. Moreover, the dispatch manager component (117) can also be present in the client so that the client can directly dispatch requests to the primary node. For example, the distributed object manager component (114) on the receiving node can interact with a partition map to check if the node is indeed designated as the primary node as part of a plurality of nodes associated with the distributed cache, and can call the object manager component (112) to perform the operation. In the case of write operations, the distributed object manager component (114) can also communicate with a replicator to replicate the data to the secondary nodes. The distributed object manager component (114) can also interact with failover manager systems (not shown) to clone regions to create new secondary or primary nodes during reconfiguration procedures subsequent to possible failures.

The object manager component (112) can further include a notification management component (123) that can track changes to regions and objects, and can relay notifications to delegates listening to those events. Moreover, applications can also register delegates for notifications on any node which may be different from the primary node on which the object resides. The distributed object manager component (114) can further manage the propagation of notifications in a distributed fashion including providing high availability for such notifications when the primary node fails. For example, this can be handled by maintaining a local lookup table indexed by delegate id on the node where the application registers the delegate. The primary node that stores the object can maintain the delegate id and the originating node information. When an object changes, the distributed object manager component (114) of the primary node can notify all the originating nodes, passing along the delegate id.

Similarly, the distributed object manager component (114) associated with the receiver can employ the lookup table to call the appropriate delegate, thus providing the change information to the application in a distributed fashion. For example, notifications can be asynchronous and can further be backed up using the same secondary nodes. Accordingly, in the event of failures, the secondary nodes can attempt to deliver the pending notifications, wherein in the event of primary node failure, notifications can be resent because the primary node may not have synchronized the information regarding the delivered notifications before failure. Since all notifications can carry the region, key and version information, the application can use the version to ignore duplicate notifications. Following are some examples of callback syntax.

EXAMPLE

Region Level Callback

```
public delegate CacheCallback
elec_cbk = new CacheCallback( myclass.handler );
catalog.addCallback("ElectronicsRegion", elec_cbk);
Callback called for any updates to region
```

EXAMPLE

Object Level Callback

```
public delegate CacheItemRemovedCallback
elec_cbk = new CacheItemRemovedCallback( );
// Add the callback to the object ; the elec_cbk delegate will be called
// whenever the object changes regardless of where the object is present
catalog.Add("ElectronicsRegion", "key", object, elec_cbk);
```

The availability substrate (111) can provide scalability and availability to systems that contain a storage component associated with the distributed cache. For example, the availability substrate can include load balancers, fail over managers, replicators and the like. A communication substrate (109) can provide for failure detection of nodes and reliable message delivery between nodes. The communication substrate (109) can interact with the availability substrate (111). Moreover, the communication substrate (109) can also provide the communication channels and cluster management. The communication substrate (109) can provide callbacks whenever a new node joins the cluster or when a node dies or fails to respond to exchanged messages (e.g., heart beat messages). Moreover, the communication substrate (109) can provide efficient point-to-point and multicast delivery channels, and can further provide reliable message delivery for implementing replication protocols. For example, the communication substrate (109) can support notifications by maintaining delegate information in cache items and triggering the notification when items are modified. The communication substrate (109) can also trigger eviction based on policies defined at the region or named cache level.

B. Cache Topology

Figure 2:
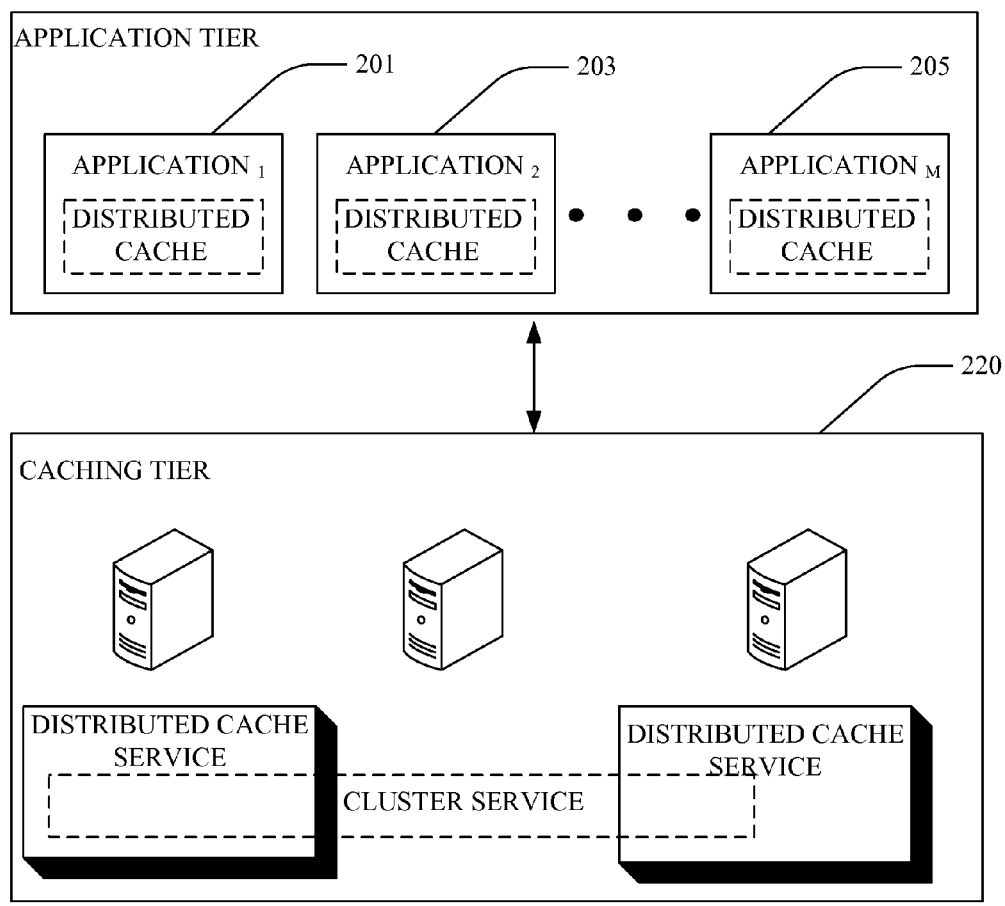
FIG. 2 illustrates a further topology model of a layering arrangement that relates to an independent separate tier model implementation.
Figure 3:
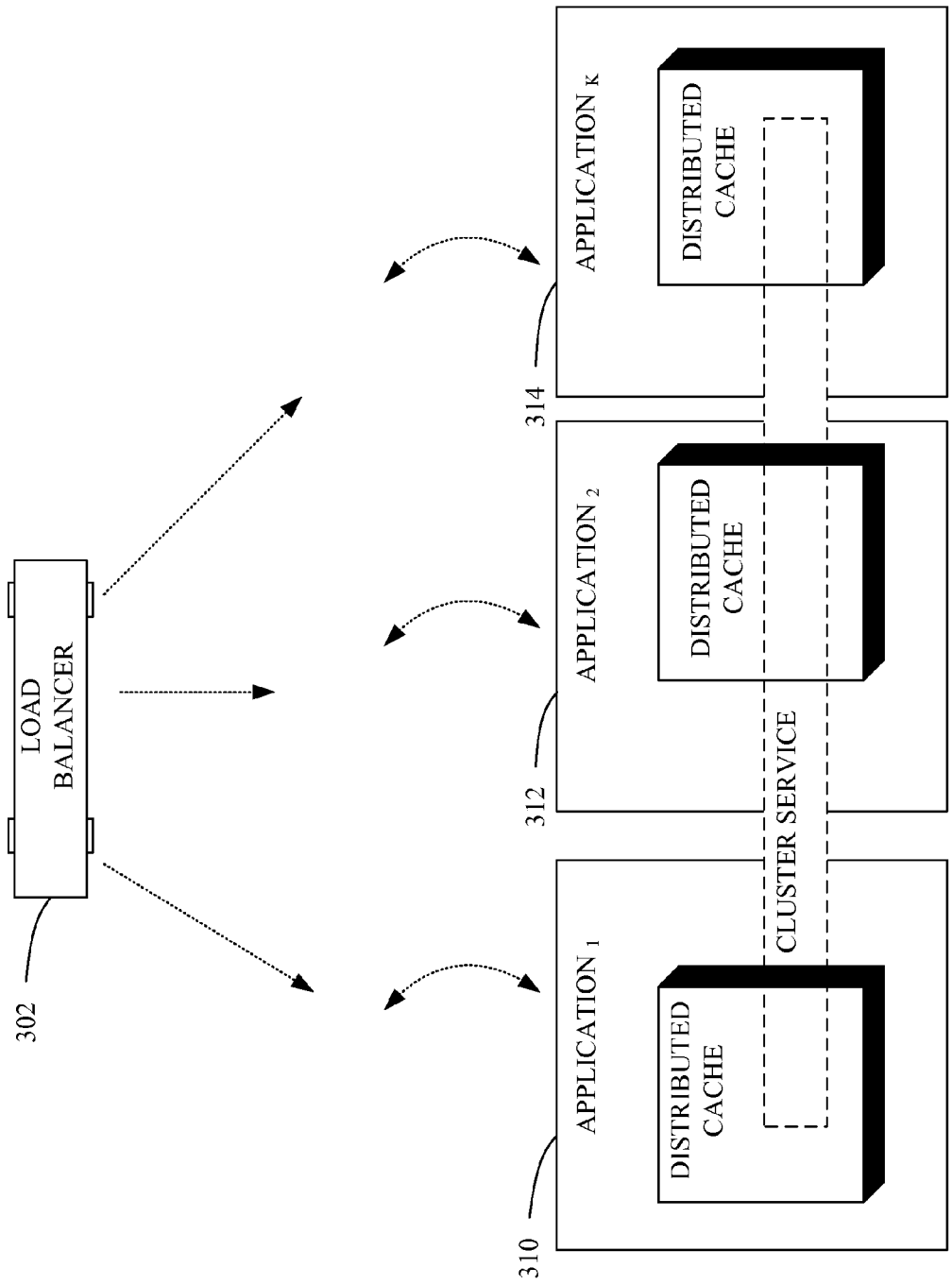
FIG. 3 illustrates a topology model of a layering arrangement that pertains to an embedded application model.

FIG. 2 and FIG. 3 illustrate two topology models, namely an independent separate tier model, and an embedded application model, respectively. According to one particular aspect, in the independent and separate tier model of FIG. 2, the caching tier (220) can function as an independent separate tier by itself (which can be positioned between application servers and data servers). For example, in such configuration the distributed cache system can run as a service hosted either by WAS or windows service and can run separate from the application. The applications (201, 203, 205) (1 to m, m being an integer) can either employ the client stubs provided by the distributed cache to communicate with the cache system, or can communicate directly into the service, such as through a representational state transfer (REST) API.

Alternatively, in the embedded application model the cache system can be embedded within the application itself as illustrated in FIG. 3. Such can occur by connecting the applications (310, 312, 314) (1 to k, k being an integer) together to form a cluster; for instance as embedding caches in ASP.net instances to form a cluster of ASP.net machines, wherein upon storing an item in a local cache it can be viewed from other machines. For example, the distributed cache runtime dlls can be compiled with the application and the application can act as the cache host for the distributed cache runtime. All the thread pools and memory can come from the application's container.

In a related aspect, a Load Balancer (302) can dynamically redistribute load across the cluster in the event that one or more nodes are inundated. For example, data can be repartitioned to spread it to nodes that have less loads. All such nodes can periodically send their load status as part of the configuration metadata. The load balancer (302) can also periodically query the configuration to determine which nodes are overloaded and can be balanced. For example, distributing the load may include repartitioning the overloaded partition of data on a primary node and spreading the overloaded partition to one (or more) of its secondary nodes. This may involve only a change in the configuration data (partition map) and no data movement (since the secondary nodes already have the data). In other scenarios, the data may be distributed to other non-secondary nodes since the secondary nodes themselves might be loaded and cannot handle the additional load. In such cases, either the data partitions on the secondary nodes (for which this node is the primary) can be further load balanced; or non-secondary nodes can be chosen to distribute the load, in which case in addition to the changes in the partition map, data can be moved.

C. Distributed Cache Structure

Figure 4:
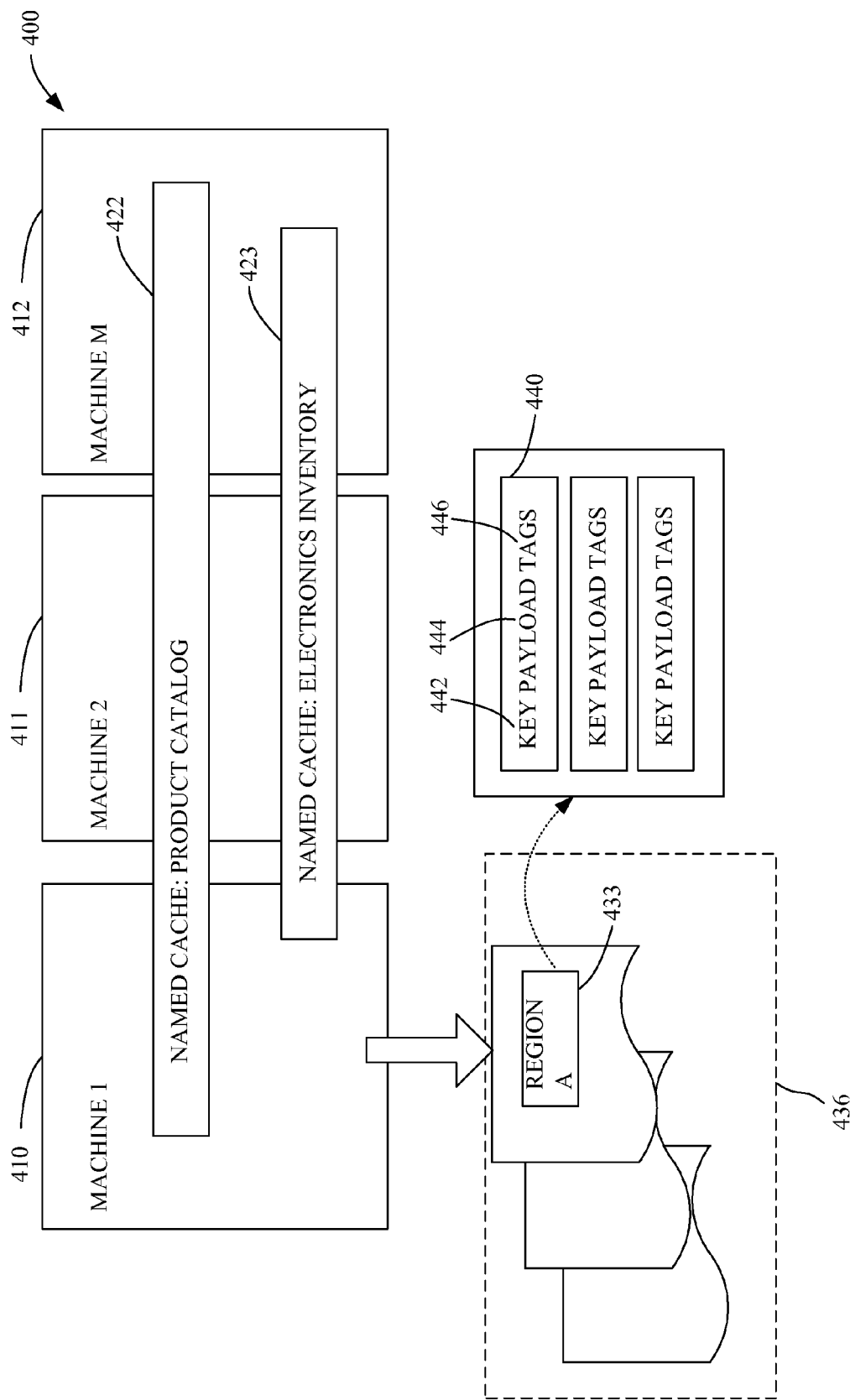
FIG. 4 illustrates a distributed cache that includes a runtime deployed on multiple machines.

FIG. 4 illustrates a distributed cache system (400) that includes the runtime deployed on multiple machines (410, 411, 412) (1 to m, m being an integer) that form a cluster. On each machine (410, 411, 412) there can exist one or more runtimes also referred to as cache hosts. Each cache host (422, 423) can host one or more named caches. The named caches can be configured in the distributed cache configuration file. Moreover, the named caches can be spread around all or a subset of the machines (410, 411, 412) in the cluster. In addition, one or more regions (433) can exist within each named cache. Such regions can be implicitly created by the distributed cache or can be explicitly defined by the application. In general, all items in a region (433) can be guaranteed to be co-located on a cache host, such as by assigning one or more regions (433) to a single partition (436), rather than spreading regions across multiple partitions. Such can improve performance for operations that operate on multiple items in the region, such as query and other set operations. Moreover, the node where a region is located can be deemed as the primary node of that region, wherein typically access to this region will be routed to the primary node for that region. If the named cache is configured to have "backups" for high availability, then one or more other nodes can be chosen to contain a copy of this data. Such nodes are called secondary nodes for that region. All changes made to the primary node can also be reflected on these secondary nodes. Thus if the primary node for a region fails, the secondary node can be used to retrieve the data without having to have logs written to disk.

The following is a code example that shows the creation of a named cache and region.

```
// CacheFactory class provides methods to return cache objects
// Create instance of cachefactory (reads appconfig)
DataCacheFactory fac = new DataCacheFactory( );
// Get a named cache from the factory
DataCache catalog = fac.GetCache("catalogcache");
//------------------------------------------------------
// Simple Get/Put
catalog.Put("toy-101", new Toy("thomas", .,.));
// From the same or a different client
Toy toyObj = (Toy)catalog.Get("toy-101");
// ------------------------------------------------------
// Region based Get/Put
catalog.CreateRegion("toyRegion");
// Both toy and toyparts are put in the same region
catalog.Put("toy-101", new Toy( .,.), "toyRegion");
catalog.Put("toypart-100", new ToyParts(...),"toyRegion");
Toy toyObj = (Toy)catalog.Get("toy-101", "toyRegion");
```

Each cache region (433) can include one or more cache items (440). Each cache item can include an identifier such as a key (442), a value or payload (444), and one or more tags (446). Cache regions may also be nested so that a cache region may include one or more other cache regions (433) and/or one or more cache items (440).

III. Cache Layering Techniques

Figure 5:
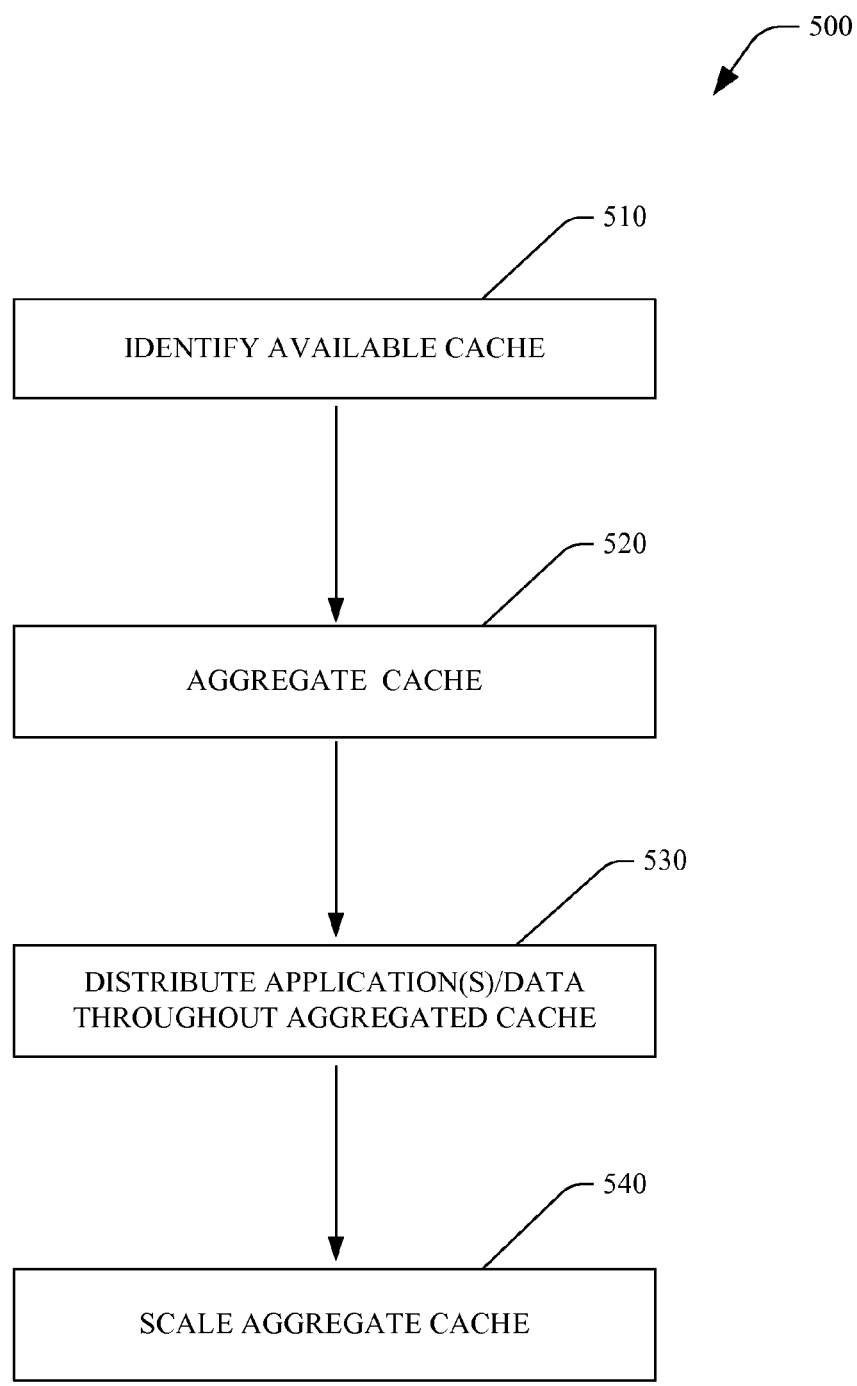
FIG. 5 illustrates a particular methodology of distributing cache.

FIG. 5 illustrates a related methodology (500) of distributing a cache. While the exemplary methods of FIG. 5 and other figures herein are illustrated and described herein as a series of blocks representative of various events and/or acts, the described tools and techniques are not limited by the illustrated ordering of such blocks. For instance, some acts or events may occur in different orders and/or concurrently with other acts or events, apart from the ordering illustrated herein, in accordance with the described tools and techniques. In addition, not all illustrated blocks, events or acts, may implement a methodology in accordance with the described tools and techniques. Moreover, the exemplary method and other methods according to the tools and techniques may be implemented in association with one or more of the methods illustrated and described herein, as well as in association with other systems and apparatus not illustrated or described.

In the methodology (500), cache available to the system can be identified (510), wherein the cache can be scalable to a plurality of machines via a layering arrangement (e.g., dynamic scaling by adding new nodes). The cache can be aggregated (520) into a single unified cache, as presented to a user thereof. Applications/data can be distributed (530) throughout the aggregated cache. In addition, the aggregated cache can be scaled (540) depending on the changing characteristics of the applications and/or data.

Figure 6:
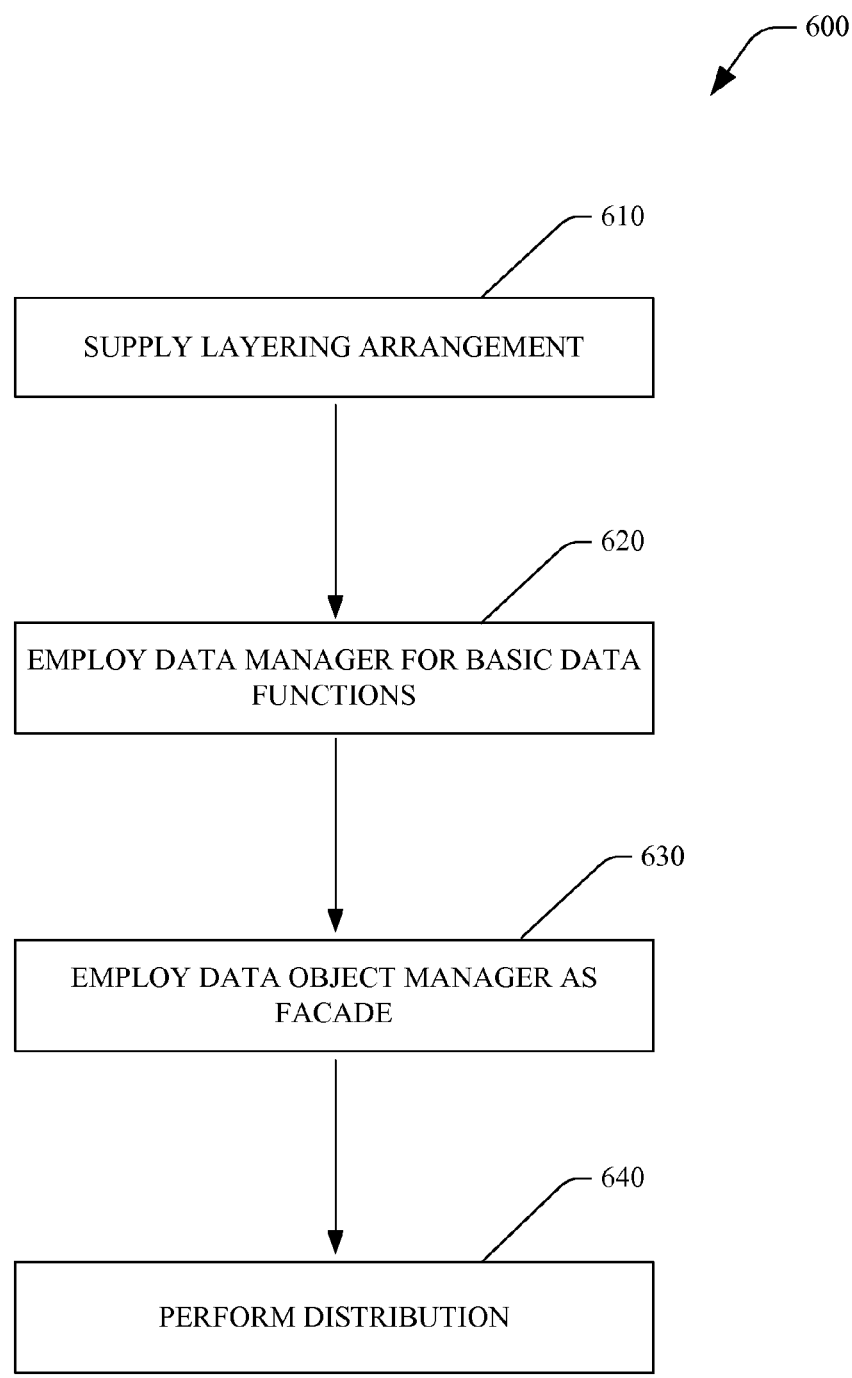
FIG. 6 illustrates a further methodology of implementing a layering arrangement for a distributed cache.

FIG. 6 illustrates a related methodology (600) of implementing a distributed cache via a layering arrangement. Initially a layering arrangement can be supplied (610). The layering arrangement can include a data manager component, an object manager component and a distributed object manager component—the set up of which can be implemented in a modular fashion; wherein, the distributed object manager component can be positioned on top of the object manager component, which can be placed on top of the data manager component.

The data manager component can be employed (620) to supply basic data functions (e.g., hash functions). Likewise, the object manager component can be employed (630) as an object facade thereon including cache objects, with the distributed object manager component providing the distribution. As such, the object manager component and data manager component can act as local entities, wherein the distribution manager can perform (640) the distributions.

IV. Unified Cache System & Data Types

Figure 7:
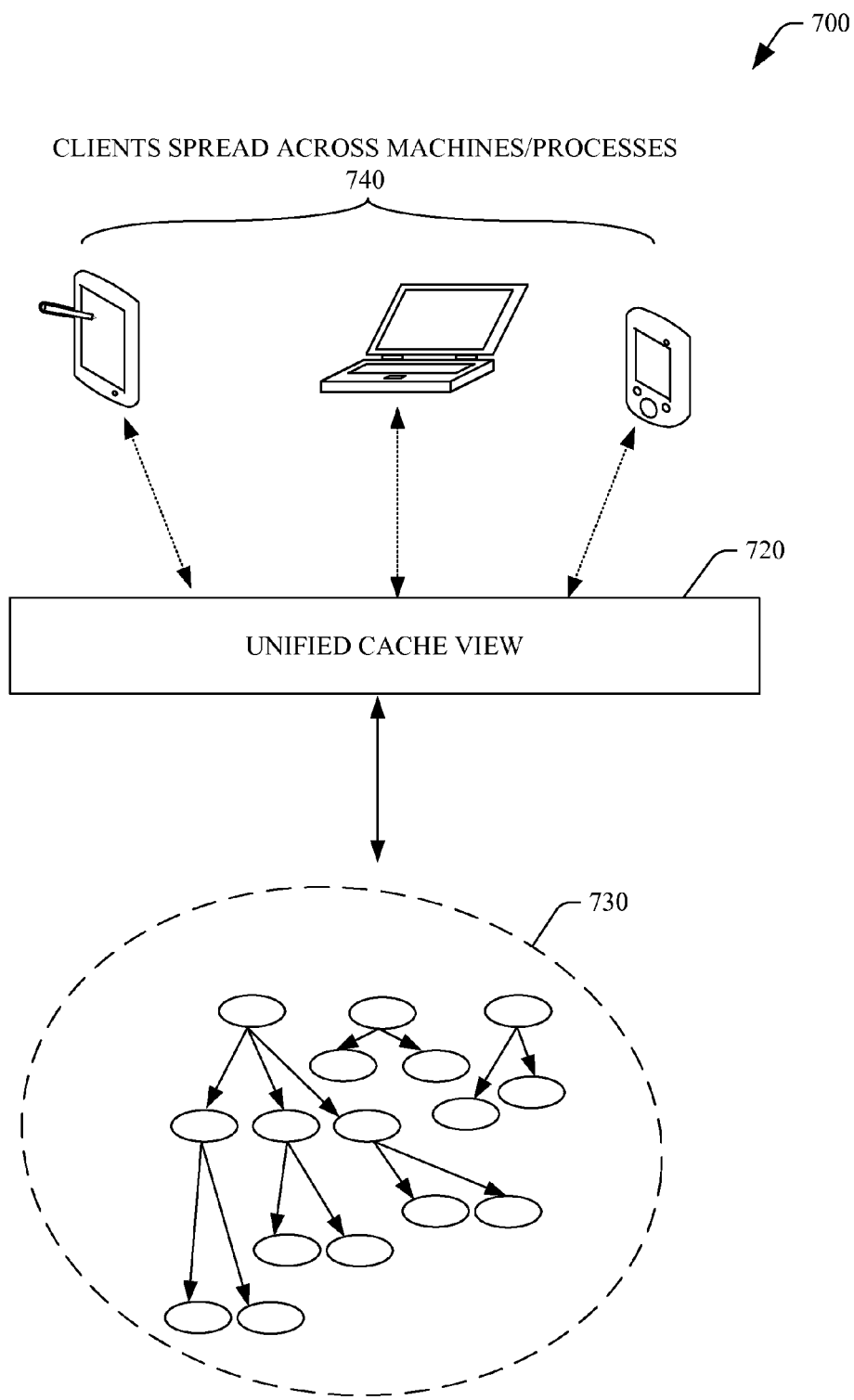
FIG. 7 illustrates an exemplary illustration of a unified cache view.

FIG. 7 illustrates a cache system (700) that can provide a unified cache view (720) of one or more caches (730) for clients (740) spread across machines and/or processes. A cache system (700) including this unified cache view (720) can provide an explicit, distributed, in-memory application cache for all kinds of data with consistency and query. Such data can reside in different tiers (in different service boundaries) with different semantics. For example, data stored in the backend database can be authoritative and can make it desirable to have a high degree of data consistency and integrity. Typically, there tends to be a single authoritative source for any data instance. Most data in the mid-tier, being operated by the business logic tends to be a copy of the authoritative data. Such copies are typically suitable for caching. As such, understanding the different types of data and their semantics in different tiers can help define desired degrees of caching.

A. Reference Data

Reference data is a version of the authoritative data. It is either a direct copy (version) of the original data or aggregated and transformed from multiple data sources. Reference data is practically immutable—changing the reference data (or the corresponding authoritative data) creates a new version of the reference data. That is, every reference data version can be different from other reference data versions. Reference data is a candidate for caching; as the reference data typically does not change, it can be shared across multiple applications (users), thereby increasing the scale and performance.

For example, a product catalog application aggregating product information across multiple backend application and data sources can be considered. Most common operation on the catalog data is the read operation (or browse); a typical catalog browse operation iterates over a large amount of product data, filters it, personalizes it, and then presents the selected data to the users. Key based and query based access is a common form of operation. Caching can be beneficial for catalog access. If not cached, operations against such an aggregate catalog may include the operations to be decomposed into operations on the underlying sources, to invoke the underlying operations, to collect responses, and to aggregate the results into cohesive responses. Accessing the large sets of backend data for every catalog operation can be expensive, and can significantly impact the response time and throughput of the application. Caching the backend product data closer to the catalog application can significantly improve the performance and the scalability of the application. Similarly, aggregated flight schedules are another example of reference data.

Referenced data can be refreshed periodically, usually at configured intervals, from its sources, or refreshed when the authoritative data sources change. Access to reference data, though shared, is mostly read. Local updates are often performed for tagging (to help organize the data). To support large scale, reference data can be replicated in multiple caches on different machines in a cluster. As mentioned above, reference data can be readily cached, and can provide high scalability.

B. Activity Data

Activity data is generated by the currently executing activity. For example, the activity may be a business transaction. The activity data can originate as part of the business transaction, and at the close of the business transaction, the activity data can be retired to the backend data source as historical (or log) information. For example, the shopping cart data in an online buying application can be considered. There is one shopping cart, which is exclusive, for each online buying session. During the buying session, the shopping cart is cached and updated with products purchased, wherein the shopping cart is visible and accessible only to the buying transaction. Upon checkout, once the payment is applied, the shopping cart is retired (from the cache) to a backend application for further processing. Once the business transaction is processed by the backend application, the shopping cart information is logged for auditing (and historical) purposes.

While the buying session is active, the shopping cart is accessed both for read and write; however, it is not shared. This exclusive access nature of the activity data makes it suitable for distributed caching. To support large scalability of the buying application, the shipping carts can be distributed across the cluster of caches. Since the shopping carts are not shared, the set of shopping carts can be partitioned across the distributed cache. By dynamically configuring the distributed cache, the degree of scale can be controlled.

C. Resource Data

Both reference (shared read) and activity (exclusive write) data can be cached. It is to be appreciated that not all application data falls into these two categories. There is data that is shared, concurrently read and written into, and accessed by large number of transactions. For example, considering inventory management application, the inventory of an item has the description of the item and the current quantity. The quantity information is authoritative, volatile, and concurrently accessed by large number of users for read/write. Such data is known as the resource data; the business logic (e.g. the order application logic) runs close to the resource data (e.g. quantity data). The resource data is typically stored in the backend data stores. However, for performance reasons it can be cached in the application tier. While caching the quantity data in memory on a single machine can provide performance improvements, a single cache typically cannot provide availability or scale when the order volume is high. Accordingly, the quantity data can be replicated in multiple caches across the distributed cache system.

V. Distributed Cache with Artificial Intelligence Component

Figure 8:
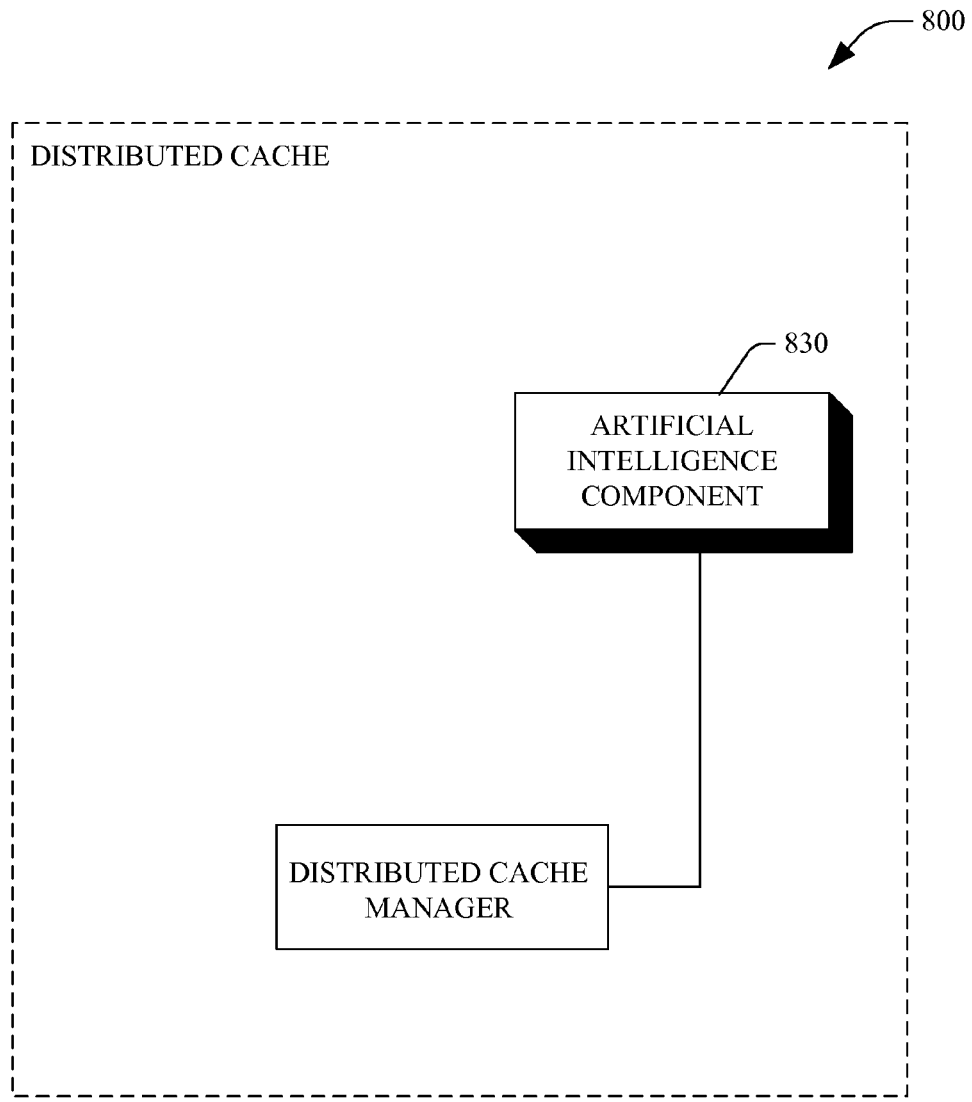
FIG. 8 illustrates an artificial intelligence (AI) component that can be employed to facilitate inferring and/or determining when, where, and/or how to cache data in a distributed environment.

FIG. 8 illustrates an artificial intelligence (AI) component (830) that can be employed in a distributed cache (800) to facilitate inferring and/or determining when, where, and/or how to scale the distributed cache and/or distribute application data therebetween. For example, such artificial intelligence component (830) can supply additional analysis with the distributed cache manager to improve distribution and/or scaling of the system. As used herein, the term "inference" refers generally to the process of reasoning about or inferring states of the system, environment, and/or user from a set of observations, as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The AI component (830) can employ any of a variety of suitable AI-based schemes as described supra in connection with facilitating various aspects of the herein described tools and techniques. For example, a process for learning explicitly or implicitly how or what candidates are of interest, can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, classifiers can be explicitly trained (e.g., via a generic training data) as well as implicitly trained (e.g., via observing user behavior, receiving extrinsic information) so that the classifier can be used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence(class). Moreover, a rule based mechanism can further be employed for interaction of a routing manager and a routing layer associated therewith (e.g., load balancing, memory allocation and the like).

VI. Suitable Computing Environment

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or a portion thereof in any manner. It is to be appreciated that a myriad of additional or alternate examples could have been presented, but have been omitted for purposes of brevity.

Furthermore, all or portions of the described tools and techniques can be implemented as a system, method, apparatus, or article of manufacture using standard programming and/or engineering techniques to produce software, firmware, hardware or any combination thereof to control a computer to implement the disclosed tools and techniques. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
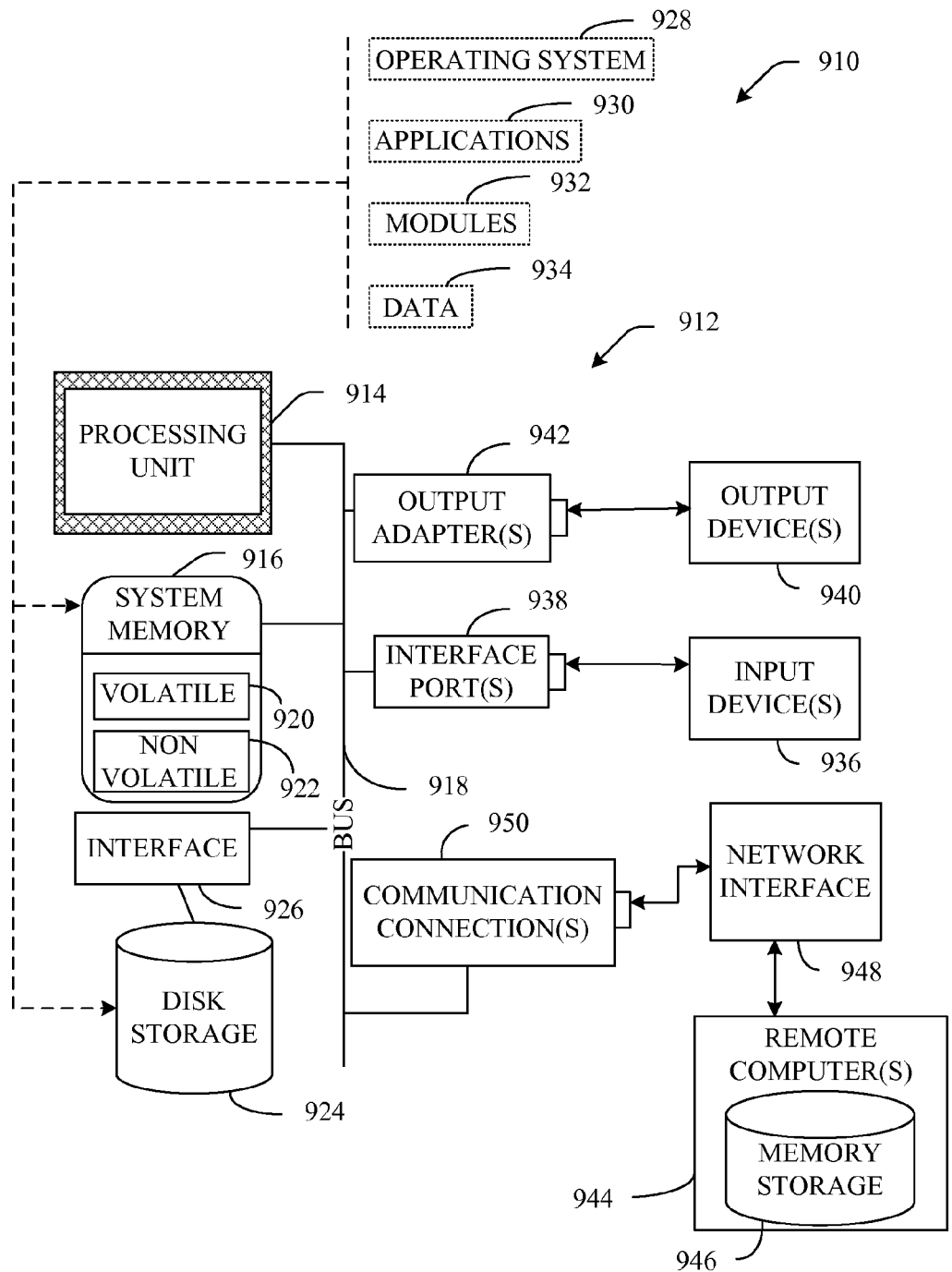
FIG. 9 illustrates an exemplary environment for implementing various aspects of the described caching tools and techniques.
Figure 10:
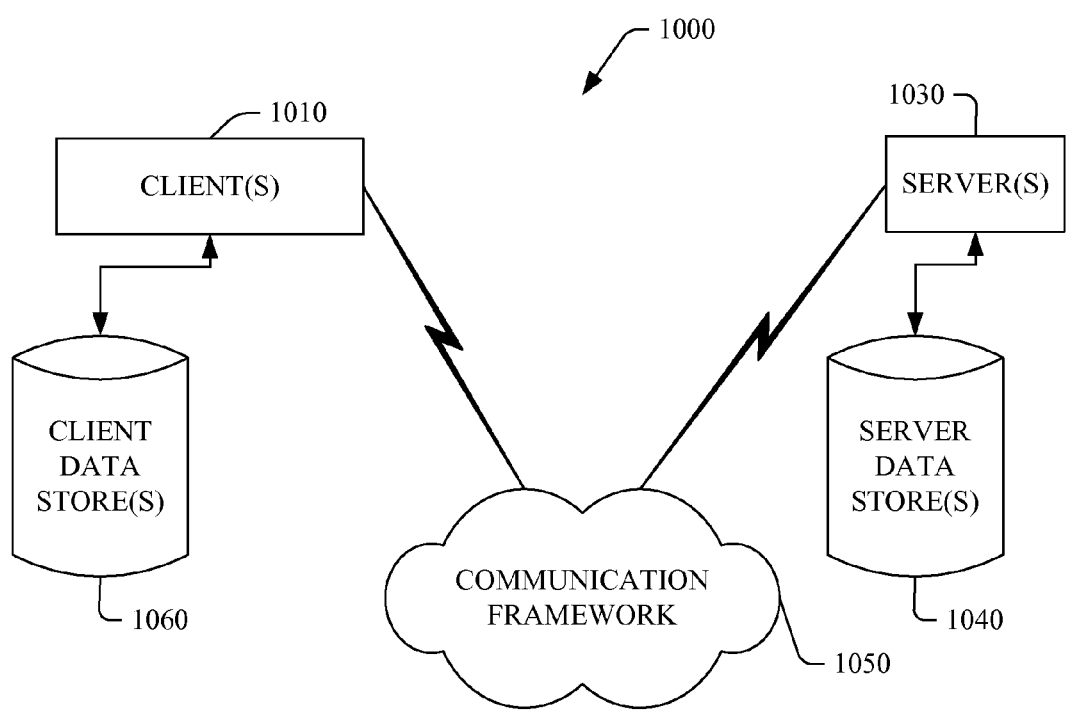
FIG. 10 is a schematic block diagram of a sample-computing environment that can be employed for caching configurations such as distributing cache.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the tools and techniques also may be implemented in combination with other program modules.

As used in this application, the terms "component", "system", and "engine" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multi-processor computer systems, mini-computing devices, main-frame computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the tools and techniques can be practiced on stand-alone computers. In a distributed computing environment, program modules may be located in both local and remote memory storage devices.

With reference to FIG. 9, an exemplary environment (910) for implementing various aspects of the described tools and techniques is described that includes a computer (912). The computer (912) can include a processing unit (914), a system memory (916), and a system bus (918). The system bus (918) can couple system components including, but not limited to, the system memory (916) to the processing unit (914). The processing unit (914) can be any of various available processors. Dual microprocessors and other multiprocessor architectures also can be employed as the processing unit (914).

The system bus (918) can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory (916) can include volatile memory (920) and/or nonvolatile memory (922). The basic input/output system (BIOS), containing the basic routines to transfer information between elements within the computer (912), such as during startup, can be stored in nonvolatile memory (922). By way of illustration, and not limitation, the nonvolatile memory (922) can include read only memory (ROM), programmable ROM (PROM), electrically programmable ROM (EPROM), electrically erasable ROM (EEPROM), or flash memory. The volatile memory (920) can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer (912) can also include removable/non-removable, volatile/nonvolatile computer storage media. FIG. 9 illustrates a disk storage (924), wherein such disk storage (924) can include, but is not limited to, devices like a magnetic disk drive, floppy disk drive, tape drive, Jaz drive, Zip drive, LS-60 drive, flash memory card, or memory stick. In addition, disk storage (924) can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage (924) to the system bus (918), a removable or non-removable interface is typically used, such as interface (926).

It is to be appreciated that FIG. 9 describes software that acts as an intermediary between users and the basic computer resources described in suitable operating environment (910). Such software can include an operating system (928). The operating system (928), which can be stored on disk storage (924), can act to control and allocate resources of the computer (912). System applications (930) can take advantage of the management of resources by operating system (928) through program modules (932) and program data (934) stored either in system memory (916) or on disk storage (924). It is to be appreciated that various components described herein can be implemented with various operating systems or combinations of operating systems.

A user can enter commands or information into the computer (912) through input device(s) (936). Input devices (936) include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit (914) through the system bus (918) via interface port(s) (938). Interface port(s) (938) include, for example, a serial port, a parallel port, a game port, and a universal serial bus (USB). Output device(s) (940) use some of the same type of ports as input device(s) (936). Thus, for example, a USB port may be used to provide input to computer (912), and to output information from computer (912) to an output device (940). Output adapter (942) is provided to illustrate that there are some output devices (940) like monitors, speakers, and printers, among other output devices (940) that utilize such adapters. The output adapters (942) include, by way of illustration and not limitation, video and sound cards that provide a means of connection between the output device (940) and the system bus (918). Other devices and/or systems of devices provide both input and output capabilities such as remote computer(s) (944).

Computer (912) can operate in a networked environment using logical connections to one or more remote computers, such as remote computer(s) (944). The remote computer(s) (944) can be a personal computer, a server, a router, a network PC, a workstation, a microprocessor based appliance, a peer device or other common network node and the like, and typically includes many or all of the elements described relative to the computer (912). For purposes of brevity, only a memory storage device (946) is illustrated with remote computer(s) (944). Remote computer(s) (944) is logically connected to the computer (912) through a network interface (948) and then physically connected via a communication connection (950). The network interface (948) encompasses communication networks such as local-area networks (LAN) and wide area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

A communication connection(s) (950) refers to the hardware/software employed to connect the network interface (948) to the bus (918). While the communication connection (950) is shown for illustrative clarity inside computer (912), it can also be external to the computer (912). The hardware/software for connection to the network interface (948) includes, for exemplary purposes only, internal and external technologies such as, modems including regular telephone grade modems, cable modems and DSL modems, ISDN adapters, and Ethernet cards.

FIG. 10 is a schematic block diagram of a sample computing environment (1000) that can be employed for distributing cache. The environment (1000) can include one or more client(s) (1010). The client(s) (1010) can be hardware and/or software (e.g., threads, processes, computing devices). The environment (1000) can also include one or more server(s) (1030). The server(s) (1030) can also be hardware and/or software (e.g., threads, processes, computing devices). The servers (1030) can house threads to perform transformations by employing the components described herein, for example. One possible communication between a client (1010) and a server (1030) may be in the form of a data packet adapted to be transmitted between two or more computer processes. The environment (1000) can include a communication framework (1050) that can be employed to facilitate communications between the client(s) (1010) and the server(s) (1030). The client(s) (1010) can be operatively connected to one or more client data store(s) (1060) that can be employed to store information local to the client(s) (1010). Similarly, the server(s) (1030) can be operatively connected to one or more server data store(s) (1040) that can be employed to store information local to the servers (1030).

VII. Location Information Update Data System and Environment

Figure 11:
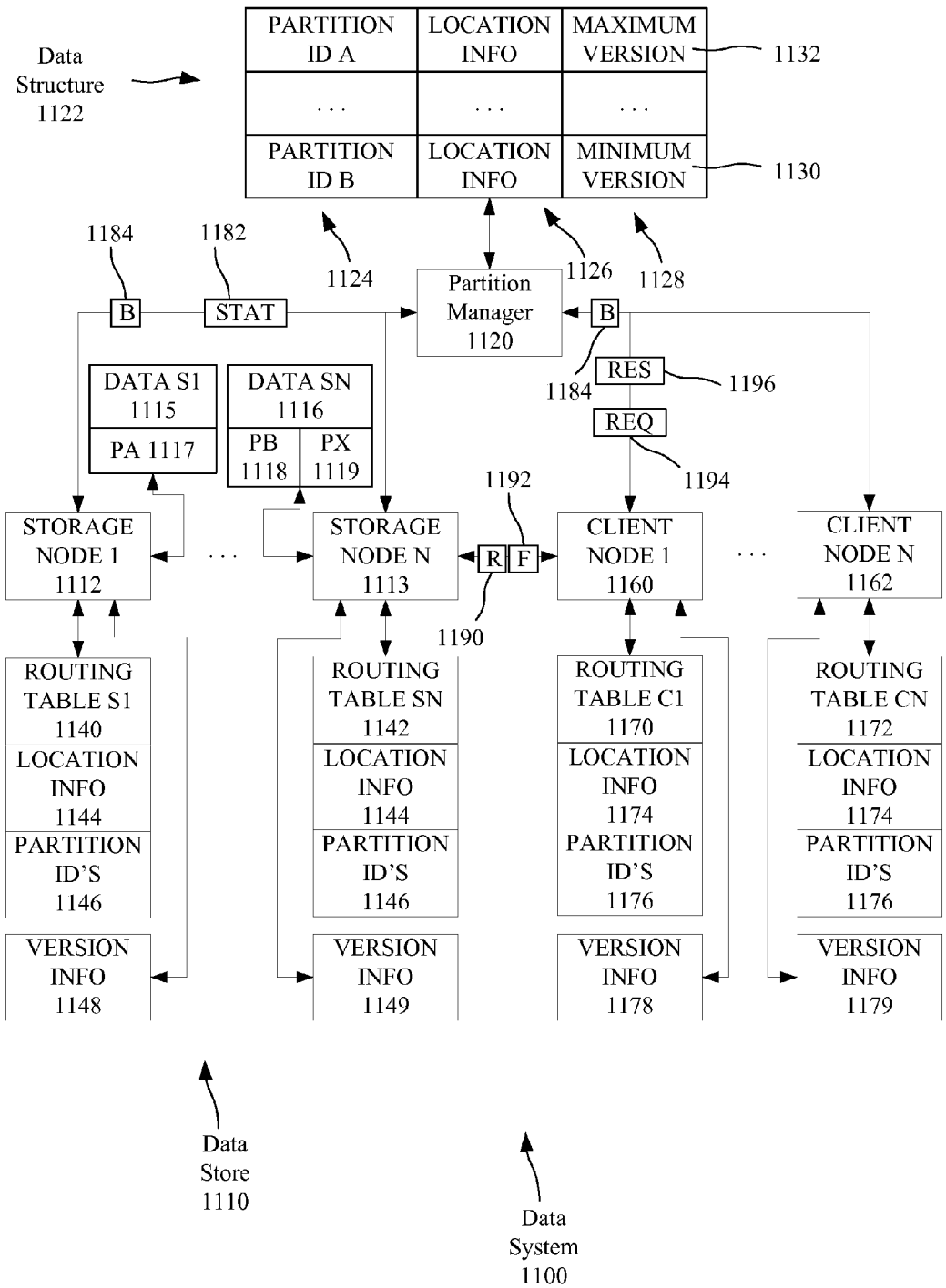
FIG. 11 is a schematic block diagram of a data system that provides location updates for a distributed data store.

FIG. 11 is a block diagram of a data system (1100) in conjunction with which one or more of the described embodiments may be implemented. The data system (1100) can include a data store (1110), which can be a distributed partitioned data store. For example, the data store (1110) can host a distributed partitioned cache, such as the distributed partitioned caches discussed above. Alternatively, the data store (1110) can be some other type of data store, such as a data store containing another type of distributed partitioned database, such as a distributed partitioned SQL database.

The data store (1110) can include a plurality storage nodes (1112 and 1113), including storage node 1 (1112) and storage node N (1113). Each of the storage nodes (1112 and 1113) can store data (1115 and 1116)) for the data store (1110). The data in the data store (1110) can be separated into partitions, with one or more partitions (1117, 1118, 1119) being stored in each storage node (1112, 1113). For example, storage node 1 may store a single partition (1117), while storage node N (1113) may store multiple partitions (1118 and 1119).

The partitions in the data store (1110) can be managed by a partition manager (1120), which can be located on a separate node, or even on a node that also acts as a storage node.

The partition manager (1120) can manage a version data structure (1122), such as a main partition map for the data store (1110). The version data structure (1122) can indicate an authoritative status of partitions in the data store (1110). The version data structure (1122) can include a partition identifier (1124) for each partition in the data store (1110), which can be a single identifier, an identifier range (such as a range of region identifiers), a list of identifiers, or some other type of identifier. The version data structure (1122) can also include location information (1126) for each partition, such as an identification of primary and secondary storage node(s) (1112, 1113) where each partition is stored. The location information (1126) can include other information to allow the corresponding partition to be accessed, such as IP addresses, URL's, storage drive and path identifiers, ports for storage nodes (1112, 1113), etc. In addition, the version data structure (1122) can include version indicators (1128). For example, the version indicators (1128) can form a range from a minimum version indicator (1130) to a maximum version indicator (1132). Many different types of version indicators are possible, such as numbers (integers or non-integers), alphabetical ranges, alphanumeric ranges, etc.

Figure 12:
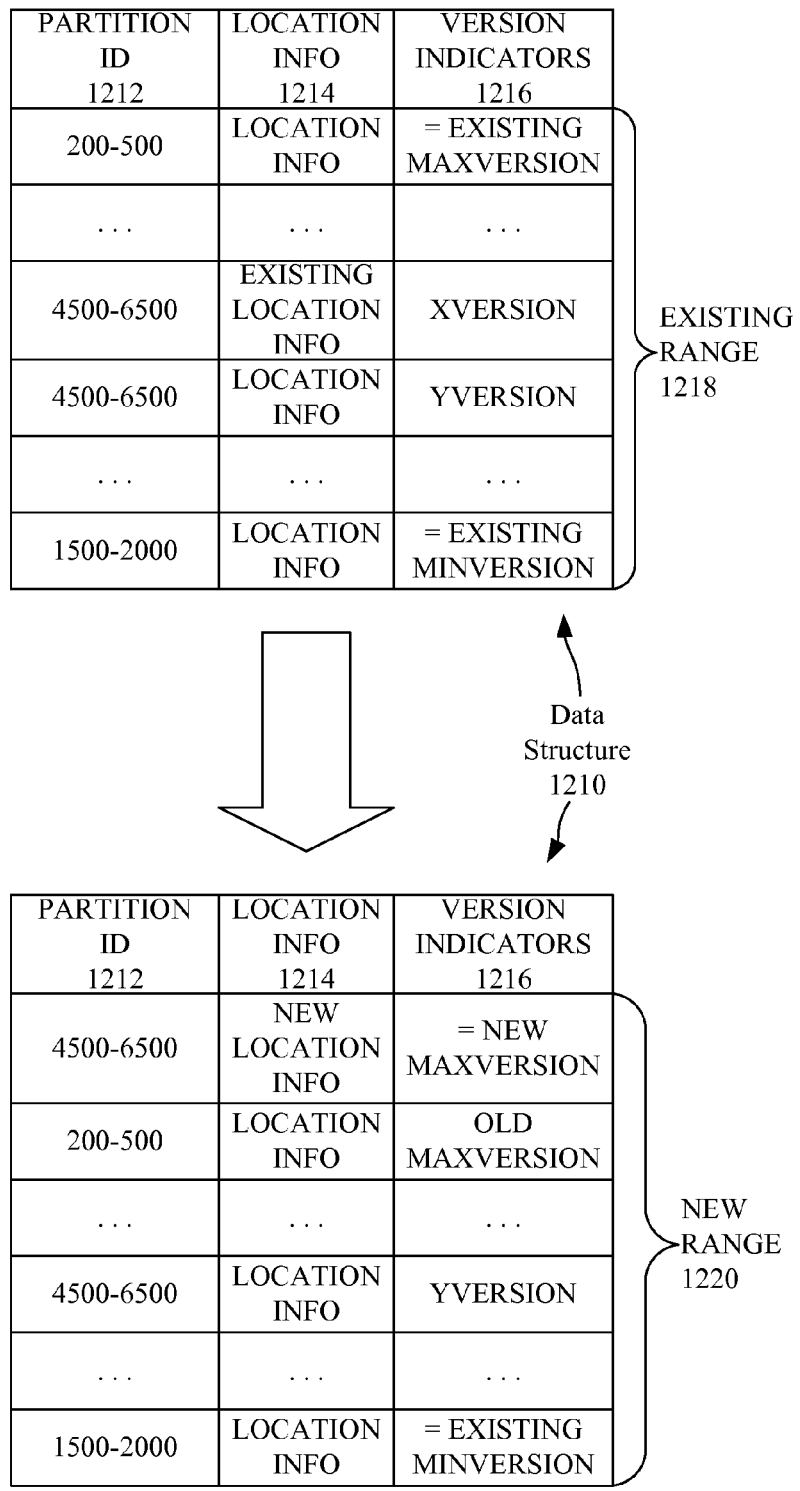
FIG. 12 is a schematic diagram illustrating maintenance of a version data structure.

Referring now to FIG. 12, maintenance of a version data structure (1210) will be described, where a partition is reconfigured so that location information (1214) is updated, such as where a partition is moved from one node to another, added to a data store, split into two partitions on different nodes, etc. As with the version data structure of FIG. 11, the version data structure (1210) of FIG. 12 includes partition identifiers (1212), location information (1214) and version indicators (1216) for corresponding partitions in the data store. However, different formats of version data structures could be used. For example, a version data structure can be a single unified data structure, or a disconnected set of version indicators listed as attributes of separate objects. The version indicators (1216) can form an existing range (1218), which can extend from a version indicator that is equal to a value of a minimum version indicator for the existing range (1218) ("=existing minversion"), to a version indicator that is equal to a value of a maximum version for the existing range (1218) ("=existing maxversion").

A partition with a partition identifier of "4500-6500" (which could indicate that regions from region identifier 4500 to region 6500 are included in the partition) can be reconfigured, such as by being moved to a new node. When that happens, the "4500-6500" partition entry in the data structure (1210) can be updated with new location information. In addition, the version indicator of the "4500-6500" partition entry can be set to a new value that is outside the existing range (1218) so that the data structure (1210) then has a new range (1220) of version indicators (1216). For example, a data manager can maintain a "MaxVersion" integer variable that is equal to the maximum value of the version indicators (1216). When location information (1214) is updated for a partition, then the MaxVersion variable can be incremented by 1 and the version indicator for the updated partition can be set equal to the new MaxVersion. In this way, the version indicators can range from a highest value corresponding to a most recently configured partition to a lowest value corresponding to a least recently configured partition. Other techniques can also be used to produce similar results. For example, a minimum MinVersion variable could be decremented instead of incrementing the maximum MaxVersion variable. Such techniques can result in gaps in the range of version indicators (1216), although if such gaps were undesirable, then other version indicators could be updated to fill in the gaps.

Referring back to FIG. 11, the data system (1100) can also include one or more client nodes (1160, 1162), which can request access to the data (1115, 1116) stored in the storage nodes (1112, 1113) in the data store (1110). Many different configurations of the nodes (1112, 1113, 1160, 1162) are possible. For example, some or all of the storage nodes (1112, 1113) could be running on the same physical and/or virtual computer machine(s) as some or all of the client nodes (1160, 1162), or all nodes (1112, 1113, 1160, 1162) could be running on separate physical or virtual machines.

The partition manager (1120) can communicate with the storage nodes (1112 and 1113) and the client nodes (1160 and 1162), such as through the layering arrangement discussed above. For example, the partition manager (1120) can communicate with the storage nodes (1112) using the clustering substrate (107) and the communication substrate (109) discussed above with reference to FIG. 1, and in some implementations the partition manager (1120) can be considered to be part of the clustering substrate (107).

In addition, the nodes (1112, 1113, 1160, 1162) can communicate with each other. To facilitate such inter-nodal communication, each storage node (1112, 1113) can access a corresponding partition map or routing table (1140, 1142), which can include location information (1144) and partition identifiers (1146) for the partitions in the data store (1110). Each storage node (1112, 1113) can also access version information data structures (1148, 1149), which can indicate ranges of version indicators corresponding to updated location information (1144) and partition identifiers (1146) that the storage node (1112, 1113) has already received. Similarly, each client node (1160, 1162) can also include a routing table (1170, 1172), which can include location information (1174) and partition identifiers (1176) for the partitions in the data store (1110). Each client node (1160, 1162) can also access version information data structures (1178, 1179), which can indicate ranges of version indicators corresponding to updated location information (1174) and partition identifiers (1176) that the client node (1160, 1162) has already received. The routing tables and version information data structures can take various forms. For example, the routing table and version information data structure for each node can be separate, or the routing tables and version information data structure for each node can be part of a single unified structure.

Referring still to FIG. 11, some communications between components of the data system (1100) will be described. The partition manager (1120) can receive status updates (1182) from the storage nodes (1112, 1113). The partition manager (1120) can use the status updates to manage the partitions. For example, the partition manager (1120) can reconfigure partitions if one or more of the storage nodes (1112, 1113) is not operating properly or is overloaded. The partition manager (1120) can also send out a broadcast message (1184) to all the nodes (1112, 1113, 1160, 1162). The broadcast message (1184) can include location information (1126) that has been updated since a previous broadcast message (1184) was sent out, due to corresponding partitions having been reconfigured since the previous broadcast message (1184). The broadcast message (1184) can also include partition identifiers (1124) and version indicators (1128) corresponding to the updated partition location information (1126). As an example, the broadcast message (1184) can list ranges of version indicators corresponding to partition location information updates in the message (1184) with sets of {StartVersion, EndVersion}, where StartVersion is one below the range, and EndVersion is the last value in the range. Alternatively, such ranges could be indicated in other ways. Such broadcast messages (1184) can be sent out periodically according to a schedule, when a predetermined number of partitions have been reconfigured, or according to some other scheme.

Each broadcast message (1184) may include location information update versions created since the immediately previous broadcast message (1184). Alternatively, a broadcast message (1184) may include addition information updates, such as all versions created since the fifth previous broadcast message. More generally, where "i" refers to the ith broadcast, the partition manager (1120) can choose StartVersion; =EndVersion$_{i-1}$, so that only the updated location information versions created since the immediately previous broadcast (i−1) are included in the present broadcast (i). Alternatively, the partition manager (1120) can choose StartVersion=EndVersion$_{i-x}$, so that the updated location information for a reconfigured partition has x chances to be broadcasted, which can reduce the impact of broadcast messages being lost.

As another example, client nodes (1160, 1162) can send access request messages to storage nodes (1112, 1113), requesting access to the data partitions (1117, 1118, 1119) stored in those storage nodes (1112, 1113). For example, client node 1 (1160) can send an access request message (1190) to storage node N (1113). For example, the access request message may be a put or get request. If the access request message (1190) is for data in partition PA (1117) in storage node 1 (1112), but the location information (1174) in the routing table (1170) of client node 1 (1160) is out of date and indicates the partition PA (1117) is on storage node N (1113), then storage node N (1113) can send a failure message (1192) in response to the access request message (1190). For example, the routing table (1170) may be out of date because changes have been made since the last broadcast message (1184) was sent by the partition manager (1120). As another example, the routing table (1170) may be out of date because client node 1 (1160) did not receive one or more of the broadcast messages (1184) because the message(s) were lost or delayed.

In response to receiving the failure message (1192), client node 1 (1160) can send a location information request message (1194) to the partition manager (1120), requesting updated location information for the partition PA (1117). Indeed, the request message (1194) can request all updated location information (1126) that client node 1 (1160) has not already received. For example, the request message (1194) may include version indicator ranges from the version information data structure (1178), indicating version indicators corresponding to location information (1174) that client node 1 has already received. In response to receiving the request message (1194), the partition manager (1120) can send a location information response message (1196), which can include location information for the partition PA (1117). Additionally, the response message (1196) may include all updated location information that client node 1 (1160) has not yet received, such as location information corresponding to version indicators (1128) that were not within the range(s) of version indicators listed in the request message (1194). Client node 1 (1160) can then send a second access request message (not shown) to storage node 1 (1112), requesting access to data in partition PA (1117). Storage node 1 (1112) can then perform one or more actions requested in the second access request message, and may send a response message including data and/or a confirmation that requested actions have been performed on data.

As an example, the request message (1194) could list the ranges with sets of StartVersion, EndVersion, where StartVersion is one below the range, and EndVersion is the last value in the range. For example, the request message (1194) may list the following ranges: {33, 122}, {130, 135}, which can be the same ranges that are listed in the version information data structure (1178) for client node 1 (1160). This can indicate that the client node 1 (1160) already has location information corresponding to version indicators 34 to and including 122 and version indicators 131 to and including 135. If the main version data structure (1122) includes version indicators (1128) from 34 to and including 125 and from 128 to and including 138, then the response message (1196) can include updated location information versions corresponding to version indicators 123 to 125, 128-130, and 136-138. The response message can also include the following StartVersion and EndVersion sets to indicate the new location information versions that are included in the response message: {122, 125}, {127, 130}, {135, 138}. Upon receiving the response message (1196), client node 1 (1160) can update its routing table C1 (1170), and can update the version information data structure (1178) by merging the ranges already indicated in the existing data structure (1178) with the new version ranges received in the response message (1196). Accordingly, the updated version information data structure (1178) can indicate the following StartVersion and EndVersion sets: {33, 125}, {127, 138}.

In merging the StartVersion and EndVersion ranges of received broadcast messages (1184) and response messages (1196) with existing version information data structures (1148, 1149, 1178, 1179), the client or storage nodes (1112, 1113, 1160, and 1162) can perform the following actions: (1) if {StartVersion, EndVersion} is a sub-range of any one of the existing ranges, it can be ignored, (2) if {StartVersion, EndVersion} has no overlap with any existing ranges, it can be inserted into the version indicator range list in the version information data structure (1148, 1149, 1178, 1179), and the node can go through all partition entries for the range, and can update corresponding entries in its routing table (1140, 1142, 1170, 1172) if the response message (1196) includes newer versions of the location information; (3) if {StartVersion, EndVersion} has an overlap with any of the existing ranges, the node can try to update one range to include the new range, and the node can go through all partition entries in the response message (1196), and if there is a newer version of location information for a partition, then the node can update the corresponding entry in its routing table (1140, 1142, 1170, 1172); and (4) the node can go through the range list in the version information data structure (1178) to see if there are ranges that can be merged (for example, if EndVersion of range 1 is greater than or equal to StartVersion of range i+1, range and range i+1 can be merged).

VIII. Distributed Data Store Location Update Techniques

Figure 13:
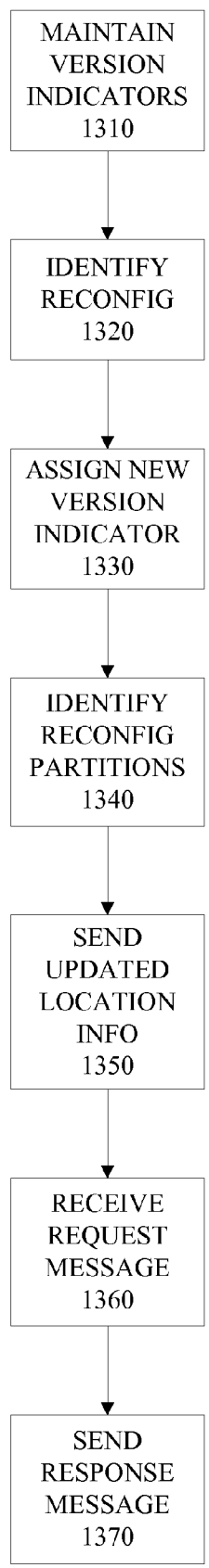
FIG. 13 is a flowchart illustrating a location update technique.

The techniques described herein can be performed with the systems described above or with other systems. In addition, parts of the techniques can be performed alone or combined with other techniques in part or in their entirety. Referring to FIG. 13, a location update technique will be described. In the technique, version indicators can be maintained (1310), where the version indicators can be within an existing range of indicators, and each version indicator in the existing range can be associated with a data partition in a distributed data store. A reconfiguration of one or more partitions in the data store can be identified (1320), such as by a partition manager, and a new version indicator can be assigned (1330) to the reconfigured partition. The new version indicator can be outside the existing range of version indicators, so that a new range of version indicators includes the new version indicator.

The technique of FIG. 13 can also include using the version indicators to identify (1340) recently reconfigured partitions in the data store, such as partitions that have been reconfigured since a previous broadcast message was sent. Updated location information for the recently reconfigured partitions can be sent (1350) to a plurality of nodes, such as by sending a broadcast message to storage nodes and/or client nodes in a data system.

In addition, version indicators can be used to identify out-of-date location information at a node and to send to the node updated location information corresponding to the out-of-date location information. For example, this can include sending a broadcast message that includes updates, which have not been previously sent to the node. As another example, this can include receiving (1360) from a requesting node a request message that requests updated location information for data in the data store. The request message can identify location information already stored at the requesting node, such as by identifying one or more ranges of version indicators corresponding to location information already stored at the requesting node. In response to the request message, a response message can be sent (1370) to the requesting node. The response message can include available location information corresponding to version indicators outside the range(s) of version indicators identified by the request message.

Figure 14:
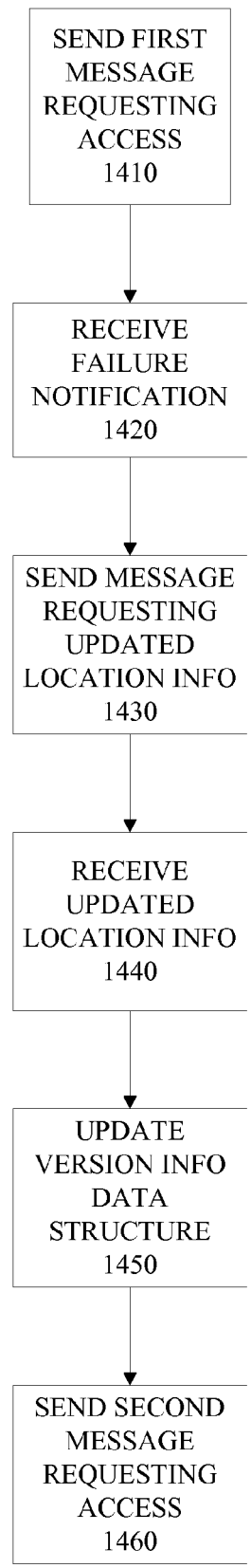
FIG. 14 is a flowchart illustrating another location update technique.

Referring now to FIG. 14, another location update technique will be described. In the technique, a first access request message can be sent (1410) to a first node in a distributed data store. The first access request message can request access to data in the data store. In response to the first access request message, a failure notification may be received (1420) from the first node. In response, a location information request message can be sent (1430), such as to a partition manager, requesting updated location information for the data requested in the first access request message. In response to the location information request message, updated location information for the data requested in the first access request message can be received (1440). A version information data structure that represents the one or more ranges of version indicators corresponding to location information that has already been received can be updated (1450) to include one or more ranges of version indicators corresponding to the updated location information received in response to the request message. In addition, the updated location information can be used to send (1460) a second access request message to a second node in the data store. The second access request message can request access to the data to which access was requested in the first access request message, where the updated location information identified the second node as a location for the data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer system comprising:
a distributed data store comprising a plurality of storage nodes;
at least one processor; and
memory comprising instructions stored thereon that when executed by at least one processor cause at least one processor to perform acts comprising:
sending a broadcast message to a plurality of nodes of a set of nodes, the set of nodes including storage nodes and client nodes that are configured to communicate with the storage nodes to access data in the distributed data store, the broadcast message comprising updated location information for data in the distributed data store; and
sending a response message to a requesting node of the plurality of nodes in response to receiving from the requesting node a request message that requests updated location information for the data in the distributed data store, the response message comprising the requested updated location information.

2. The computer system of claim 1, wherein sending the broadcast message comprises repeatedly sending broadcast messages.

3. The computer system of claim 2, wherein the updated location information in each broadcast message comprises location information that was updated after a previous broadcast message was sent.

4. The computer system of claim 3, wherein the updated location information in each broadcast message further comprises location information that was updated before the previous broadcast message was sent.

5. The computer system of claim 1, wherein at least one of the client nodes is also a storage node.

6. A computer-implemented method comprising:
sending a first access request message to a first node in a distributed data store, the first access request message requesting access to data in the distributed data store;
receiving a failure notification from the first node in response to the first access request message;
sending a location information request message, the location information request message requesting updated location information for the data requested in the first access request message; and
in response to the location information request message, receiving the updated location information for the data requested in the first access request message.

7. The method of claim 6, further comprising using the updated location information to send a second access request message to a second node in the distributed data store, the second access request message requesting access to the data in the distributed data store, and the updated location information having identified the second node as a location for the data.

8. The method of claim 6, wherein the location information request message identifies location information that has already been received, and the updated location information comprises location information that has not already been received.

9. The method of claim 6, wherein the location information request message comprises one or more ranges of version indicators corresponding to location information that has already been received.

10. The method of claim 9, further comprising updating a data structure that represents the one or more ranges of version indicators corresponding to location information that has already been received to include one or more ranges of version indicators corresponding to the updated location information received in response to the location information request message.

11. One or more computer-readable storage media having computer-executable instructions embodied thereon that, when executed by at least one processor, cause at least one processor to perform acts comprising:
sending a broadcast message to a plurality of nodes of a set of nodes, the set of nodes including storage nodes and client nodes that are configured to communicate with the storage nodes to access data in a distributed data store, the broadcast message comprising updated location information for data in the distributed data store; and
sending a response message to a requesting node of the plurality of nodes in response to receiving from the requesting node a request message that requests updated location information for the data in the distributed data store, the response message comprising the requested updated location information.

12. The one or more computer-readable storage media of claim 11, wherein sending the broadcast message comprises repeatedly sending broadcast messages.

13. The one or more computer-readable storage media of claim 12, wherein the updated location information in each broadcast message comprises location information that was updated after a previous broadcast message was sent.

14. The one or more computer-readable storage media of claim 13, wherein the updated location information in each broadcast message further comprises location information that was updated before the previous broadcast message was sent.

15. The one or more computer-readable storage media of claim 11, wherein at least one of the client nodes is also a storage node.

\* \* \* \* \*